No. 796,854. PATENTED AUG. 8, 1905.
W. H. NICHOLSON.
SHAFT COUPLING.
APPLICATION FILED DEC. 9, 1904.

WITNESSES:
S. B. Middleton
James N. Spear

INVENTOR
William H. Nicholson.
BY Herbert W. Jenner
Attorney

UNITED STATES PATENT OFFICE.

WILLIAM H. NICHOLSON, OF WILKESBARRE, PENNSYLVANIA.

SHAFT-COUPLING.

No. 796,854.    Specification of Letters Patent.    Patented Aug. 8, 1905.

Application filed December 9, 1904. Serial No. 236,204.

*To all whom it may concern:*

Be it known that I, WILLIAM H. NICHOLSON, a citizen of the United States, residing at Wilkesbarre, in the county of Luzerne and State of Pennsylvania, have invented certain new and useful Improvements in Shaft-Couplings; and I do hereby declare the following to be a full, clear, and exact description of the invention, such as will enable others skilled in the art to which it appertains to make and use the same.

This invention relates to couplings for shafts for the transmission of power; and it consists in the novel construction and combination of the parts hereinafter fully described and claimed.

Figure 1:
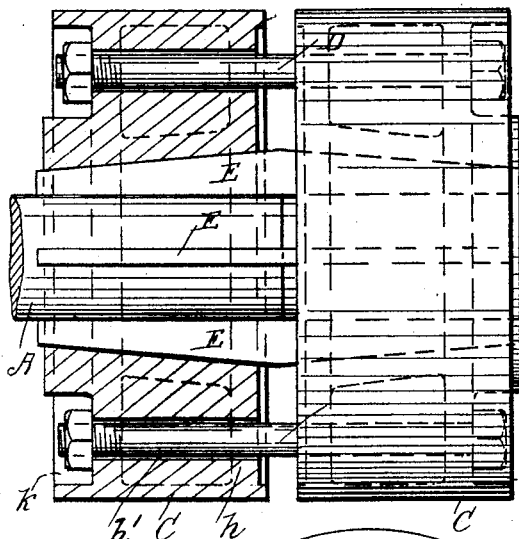
Figure 2:
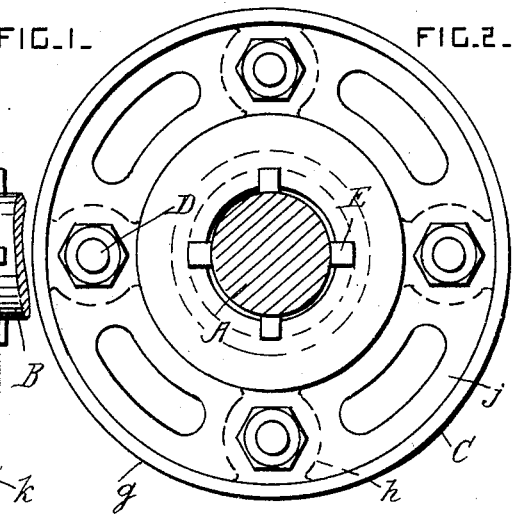
Figure 3:
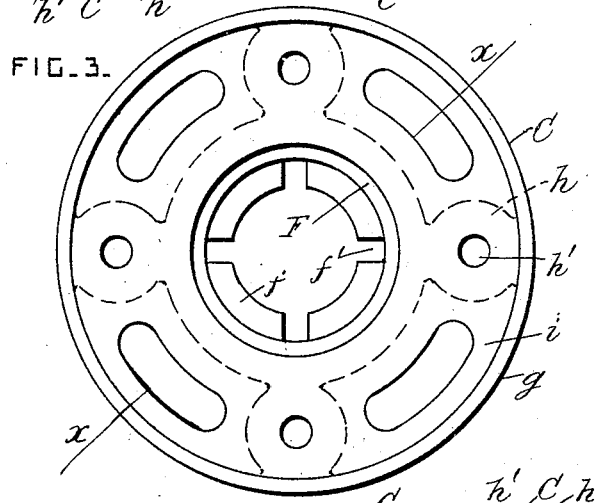
Figure 4:
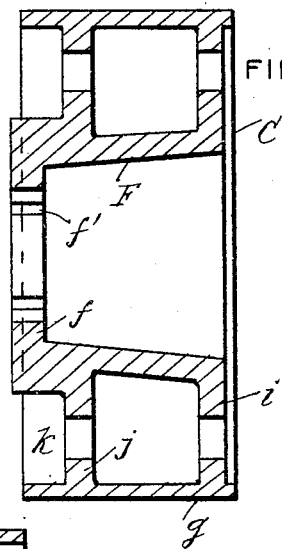
Figure 5:
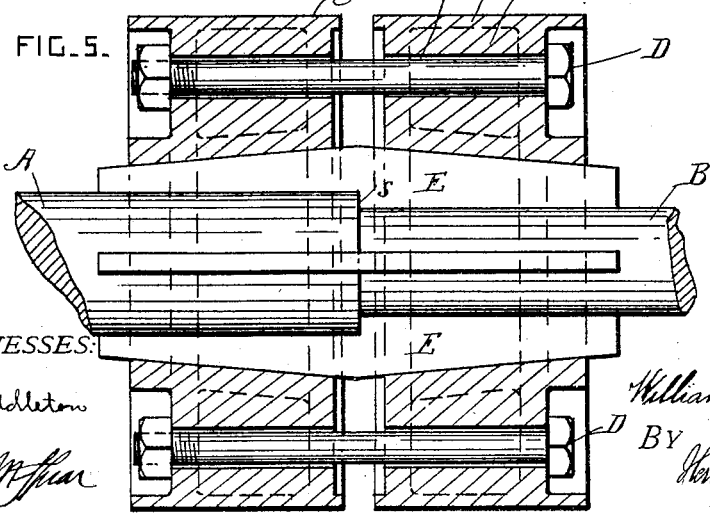

In the drawings, Figure 1 is a side view of the coupling, one of the coupling members being shown in longitudinal section. Fig. 2 is an end view of the coupling. Fig. 3 is a detail face view of one of the coupling members. Fig. 4 is a longitudinal section taken on the line $x\,x$ in Fig. 3. Fig. 5 is a longitudinal section showing a modification.

A and B are the end portions of two shafts arranged axially in line with each other.

C represents two similar coupling members, which are drawn toward each other by bolts D.

E represents double-tapered friction-jaws, which are clamped upon the end portions of the two shafts when the said coupling members are drawn toward each other. The friction-jaws are thickest at the middle of their length and taper uniformly on their outer surfaces or backs. The faces or inner surfaces of the friction-jaws are concave, so as to fit closely against the peripheries of the shafts.

Each coupling member C has a conical chamber F, which is turned so that it fits for its entire length upon the tapering backs of the friction-jaws, which are rounded slightly. At one end of this chamber, where it is smallest in diameter, a flange $f$ is provided, and this flange has slots $f'$, which engage with the end portions of the friction-jaws. This flange holds the friction-jaws at prearranged distances apart and is the only part of the coupling member which touches the sides of the jaws. The flange $f$ is narrow, and very little fitting is required to make the slots fit the end portions of the jaws, so as to slide freely upon them. Each coupling member has a cylindrical periphery $g$, and $h$ represents radial arms arranged between the periphery and the hub in which the chamber F is formed. These arms are arranged in line with the slots $f'$, so that they come over the backs of the friction-jaws, and they are provided with longitudinal holes $h'$ for the coupling-bolts D. A perforated web-plate $i$ is formed between the periphery and the hub at the larger end of the conical chamber to stiffen the casting at this point. A second perforated web-plate $j$ is formed between the periphery and the hub of the coupling member near the smaller end of the conical chamber, leaving a space $k$ for the nuts or the heads of the bolts D, so that the heads or nuts do not project at the ends of the coupling members. When the coupling members are formed in this manner, they are lighter, stronger, and stiffer than those heretofore used. They are very inexpensive to construct and set in position, and, if desired, they can be utilized as driving-pulleys.

In the modification shown in Fig. 5 two shafts of unequal diameter are shown coupled together, and the friction-jaws are provided with shoulders $s$, which abut against the end of the larger shaft.

What I claim is—

1. In a shaft-coupling, the combination, with two similar coupling members each having a hub provided with a conical chamber, an inwardly-projecting flange at the smaller end of the said chamber provided with slots for the clamping-jaws, an outer part or rim, web-plates and arms formed integral with the said hub and the said outer part or rim and provided with longitudinal bolt-holes, said arms being arranged radially over the said slots and between the said web-plates; of double-tapered friction-jaws arranged in the said slots and chambers, and coupling-bolts in the said bolt-holes.

2. In a shaft-coupling, the combination, with two similar coupling members each having a hub provided with a conical chamber and an inwardly-projecting flange at the smaller end of the said chamber provided with slots for the clamping-jaws; of double-tapered friction-jaws arranged in the said slots and chambers and provided with offset portions on their faces to enable them to engage with two shafts of different diameter, and bolts for drawing the said coupling members toward each other.

In testimony whereof I have affixed my signature in the presence of two witnesses.

WILLIAM H. NICHOLSON.

Witnesses:
GEORGE NICHOLSON,
ARTHUR L. TURNER.